United States Patent
Ono et al.

(10) Patent No.: US 12,246,664 B2
(45) Date of Patent: Mar. 11, 2025

(54) POWER SUPPLY STRUCTURE FOR HEADREST

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Masami Ono, Osaka (JP); Hidetoshi Ishida, Osaka (JP); Satoshi Yamamoto, Osaka (JP); Yasuyuki Yamamoto, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 88 days.

(21) Appl. No.: 18/023,433

(22) PCT Filed: Jul. 26, 2021

(86) PCT No.: PCT/JP2021/027455
§ 371 (c)(1),
(2) Date: Feb. 27, 2023

(87) PCT Pub. No.: WO2022/044643
PCT Pub. Date: Mar. 3, 2022

(65) Prior Publication Data
US 2023/0303017 A1    Sep. 28, 2023

(30) Foreign Application Priority Data
Aug. 31, 2020 (JP) ................................ 2020-145481

(51) Int. Cl.
*B60R 16/03* (2006.01)
*B60N 2/829* (2018.01)
(Continued)

(52) U.S. Cl.
CPC .............. *B60R 16/03* (2013.01); *B60N 2/829* (2018.02); *B60R 16/037* (2013.01); *H02J 50/10* (2016.02)

(58) Field of Classification Search
CPC ......... B60N 2/829; B60R 16/037; A47C 7/38; A61G 15/125
(Continued)

(56) References Cited

U.S. PATENT DOCUMENTS 4,222,608 A * 9/1980 Maeda ..................... A47C 7/38
297/391
8,109,570 B2 * 2/2012 Nishiura ................ B60N 2/829
297/410

(Continued)

FOREIGN PATENT DOCUMENTS

JP    H01-145245 U1    10/1989
JP    H07-241221 A    9/1995
(Continued)

OTHER PUBLICATIONS

International Search Report issued on Aug. 31, 2021 for WO 2022/044643 A1 (4 pages).

*Primary Examiner* — Jose V Chen
(74) *Attorney, Agent, or Firm* — Venjuris, P.C.

(57) ABSTRACT

A power supply structure 11 for a headrest 10 for supplying power to the headrest 10 attached to a seat body 13 includes: a power supply coil 16 that is located in the seat body 13; a power reception coil 30 that is located in the headrest 10 and receives power from the power supply coil 16; and an elastic member 21 that is located in at least one of the seat body 13
(Continued)

and the headrest 10 and urges the power supply coil 16 and the power reception coil 30 in a direction that approaches each other.

9 Claims, 9 Drawing Sheets

(51) Int. Cl.
  *B60R 16/037* (2006.01)
  *H02J 50/10* (2016.01)
(58) Field of Classification Search
  USPC .................................................. 297/391–410
  See application file for complete search history.

(56) References Cited

U.S. PATENT DOCUMENTS

| | | | | |
|---|---|---|---|---|
| 9,283,897 | B2* | 3/2016 | Wolgast | B64D 11/06 |
| 2006/0220434 | A1* | 10/2006 | Schulz | B60N 2/809 |
| | | | | 297/410 |
| 2010/0007805 | A1 | 1/2010 | Vitito | |
| 2010/0164271 | A1* | 7/2010 | Song | B60N 2/815 |
| | | | | 297/410 |
| 2010/0225153 | A1* | 9/2010 | Togura | B60N 2/0244 |
| | | | | 297/410 |
| 2013/0140866 | A1* | 6/2013 | Yetukuri | B60N 2/844 |
| | | | | 297/408 |
| 2013/0264851 | A1* | 10/2013 | Kim | B60N 2/879 |
| | | | | 297/217.3 |
| 2015/0130247 | A1* | 5/2015 | Kondrad | B60N 2/865 |
| | | | | 297/410 |
| 2023/0219475 | A1* | 7/2023 | Kuehner | B60N 2/0228 |
| | | | | 297/217.2 |
| 2024/0131972 | A1* | 4/2024 | Kojima | B60N 2/5642 |
| 2024/0149772 | A1* | 5/2024 | Won | B60N 2/865 |

FOREIGN PATENT DOCUMENTS

| | | |
|---|---|---|
| JP | 2005-212653 A | 8/2005 |
| JP | 2015-134515 A | 7/2015 |

\* cited by examiner

POWER SUPPLY STRUCTURE FOR HEADREST

CROSS REFERENCE TO RELATED APPLICATIONS

This application is a national phase of PCT application No. PCT/JP2021/027455, filed on 26 Jul. 2021, which claims priority from Japanese patent application No. 2020-145481, filed on 31 Aug. 2020, all of which are incorporated herein by reference.

TECHNICAL FIELD

The present disclosure relates to power supply structures for headrests.

BACKGROUND

A headrest is attached to the upper surface of a seat back for the purpose of protecting the occupant's head in the event of a vehicle collision or the like. Some headrests are height adjustable as needed.

For example, JP H07-241221A discloses a headrest whose height is adjustable by a simple structure. The headrest is fixed by engagement between a snap spring provided in a holder on the seat back side and a locking groove provided in a stay extending from the headrest. Disengaging the snap spring and the locking groove makes the headrest movable. Several locking grooves are arranged at certain intervals. An operator can adjust the height of the headrest by appropriately selecting a locking groove and engaging it with the snap spring.

With this structure, the operator can easily attach and detach the headrest by inserting the stay into the holder or pulling out the stay from the holder in a state in which the snap spring is disengaged.

PRIOR ART DOCUMENT

Patent Document

Patent Document 1: JP H07-241221A

SUMMARY OF THE INVENTION

Problem to be Solved

There has been a demand for multifunctional headrests in recent years. For example, headrests including electric devices such as audio devices, e.g. speakers, and monitor screens have been developed. When using such a headrest, however, the following problem occurs in connection of electric wiring.

The electric device included in the headrest needs to be supplied with power or electric signals from the vehicle side. In some cases, a connector is provided to electrically connect the circuit on the electric device side and the circuit on the seat back side. In such cases, when attaching the headrest to the seat back, the connector needs to be connected, too. In particular, in the case where the headrest is detachable, each time the headrest is attached/detached, the operator needs to connect/disconnect the connector in addition to the conventional attachment/detachment work. It is desirable to simplify such electric connection work for the headrest.

The present disclosure has been completed based on the foregoing circumstances, and has an object of providing a power supply structure for a headrest that simplifies electric connection work.

Means to Solve the Problem

A power supply structure for a headrest according to the present disclosure is a power supply structure for a headrest for supplying power to a headrest attached to a seat body, including: a power supply coil that is located in the seat body; a power reception coil that is located in the headrest and receives power from the power supply coil; and an elastic member that is located in at least one of the seat body and the headrest and urges the power supply coil and the power reception coil in a direction that approaches each other.

Effect of the Invention

The power supply structure for a headrest according to the present disclosure can simplify electric connection work.

DETAILED DESCRIPTION TO EXECUTE THE INVENTION

Figure 1:
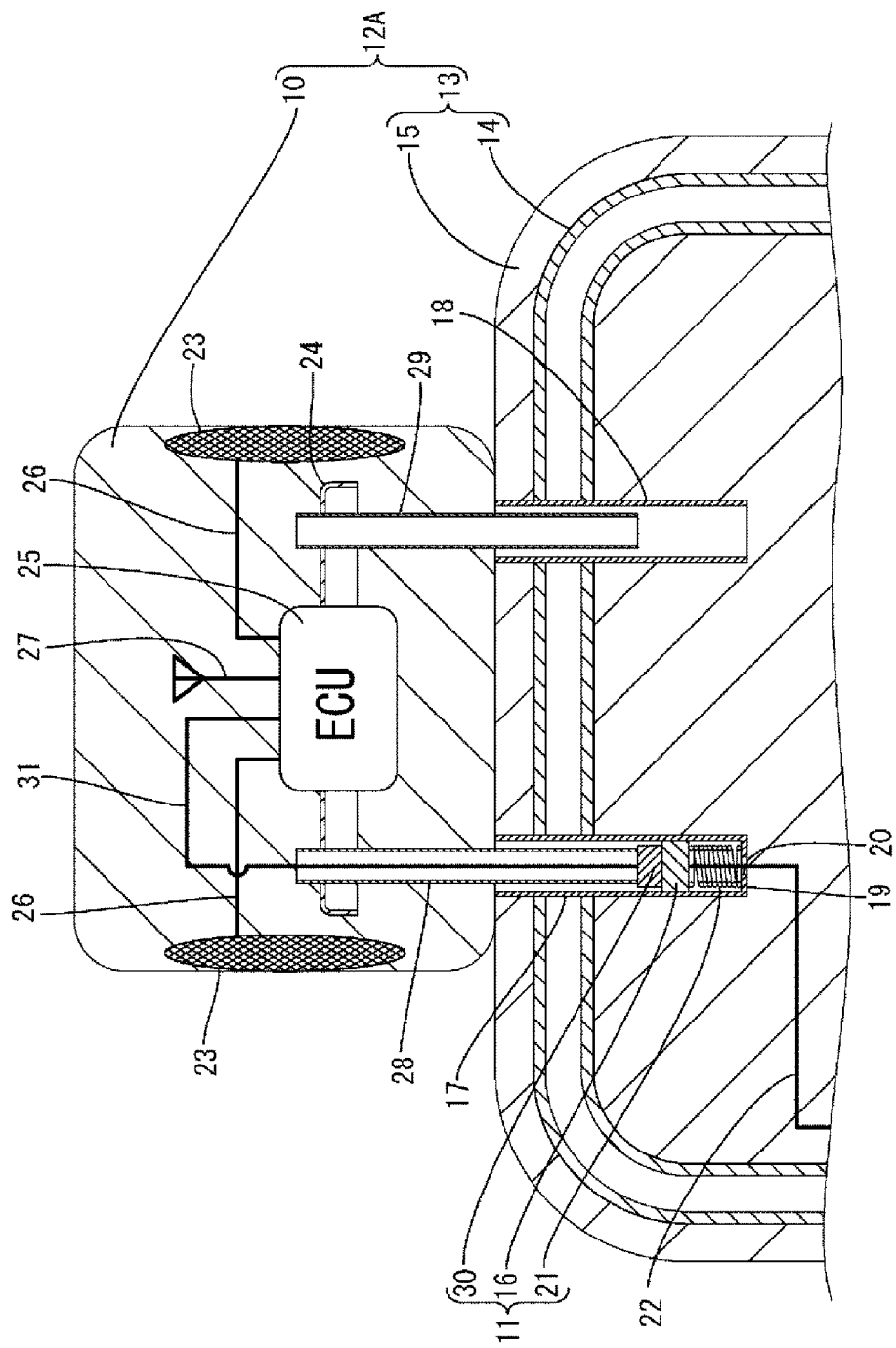
FIG. 1 is a partially enlarged schematic sectional view showing a power supply structure for a headrest attached to a seat device according to Embodiment 1.

Description of Embodiments of the Present Disclosure

First, embodiments of the present disclosure will be listed and described below.

(1) A power supply structure for a headrest according to the present disclosure is a power supply structure for a headrest for supplying power to a headrest attached to a seat body, including: a power supply coil that is located in the seat body; a power reception coil that is located in the headrest and receives power from the power supply coil; and an elastic member that is located in at least one of the seat body and the headrest and urges the power supply coil and the power reception coil in a direction that approaches each other.

Since power can be supplied from the power supply coil to the power reception coil without using a connector structure, the seat body and the headrest can be electrically connected by a simple structure. Moreover, the work of electrically connecting the seat body and the headrest can be simplified.

The elastic member urges the power supply coil and the power reception coil in a direction that approaches each other. Therefore, even in the case where the headrest moves in the vertical direction relative to the seat body, one of the power supply coil and the power reception coil can follow the other one of the power supply coil and the power reception coil, so that the power supply coil and the power reception coil can be kept in contact with each other. A decrease in the efficiency of supplying power from the power supply coil to the power reception coil can thus be prevented.

(2) Preferably, the seat body includes a headrest holder that has a tubular shape extending toward the headrest, the headrest includes a headrest stay that has a tubular shape extending toward the seat body and is fitted into or fitted onto the headrest holder, the power supply coil is located in the headrest holder, and the power reception coil is located in the headrest stay.

The headrest is attached to the seat body as a result of the headrest stay and the headrest holder being fitted together. By installing the power reception coil in the headrest stay and installing the power supply coil in the headrest holder, the power supply structure for a headrest can be installed in the seat device without an increase in the number of parts.

(3) Preferably, the headrest holder includes a support portion that supports the elastic member from below, the power supply coil is located above the elastic member, and the power reception coil is fixed at a position close to a lower end of the headrest stay.

With this structure, the elastic member can be held to the headrest stay by a simple structure.

(4) Preferably, a headrest cap having an insertion hole through which the headrest stay passes is attached to an upper end of the headrest holder, and the elastic member is located between the headrest cap and the power supply coil.

The upper end of the headrest holder is closed by the lid portion. This prevents foreign matter from entering into the headrest holder.

(5) Preferably, the elastic member is located between a lower end of the headrest and the power supply coil.

With this structure, the elastic member can be attached to the power supply structure without an increase in the number of parts.

(6) Preferably, the seat body includes a headrest holder that has a tubular shape extending toward the headrest, and a power supply holder different from the headrest holder, the power supply holder has a tubular shape extending toward the headrest, the headrest includes a headrest stay that has a tubular shape extending toward the seat body and is fitted into or fitted onto the headrest holder, and a power supply stay different from the headrest stay, the power supply stay is fitted into or fitted onto the power supply holder, and the power supply coil is located in the power supply holder, and the power reception coil is located in the power supply stay.

Since the existing structures of headrest stays and headrest holders can be used without changes, an increase in manufacturing costs can be prevented.

(7) Preferably, the power supply structure for a headrest includes a cover located around the headrest stay, the cover surrounding the headrest stay and being capable of expanding and contracting in a vertical direction.

The power supply structure for a headrest can be protected by the cover.

(8) Preferably, a conductive shield member is located at an inner surface of the cover.

Leakage of electromagnetic waves from the power supply structure for a headrest to the outside can be prevented.

Details of Embodiments of the Present Disclosure

Embodiments of the present disclosure will be described below. The present disclosure is not limited to these examples, but is defined by the claims and intended to include all modifications within the meaning and scope equivalent to the claims.

Embodiment 1

Embodiment 1 of the present disclosure will be described below, with reference to FIGS. 1 and 2. A power supply structure 11 for a headrest 10 according to this embodiment is attached to, for example, a seat device 12A mounted on a vehicle (not shown) such as an automobile. The seat device 12A includes a seat body 13 and the headrest 10. In the following description, the front, rear, left, and right refer to the directions as seen from the occupant seated on the seat device 12A.

As shown in FIG. 1, the seat device 12A includes the seat body 13 and the headrest 10 attached to the upper end of the seat body 13.

[Seat Body 13]

The seat body 13 includes a seat frame 14 made of metal, and a cushion 15 attached to the seat frame 14. The cushion 15 is made of, for example, polyurethane foam, and bears the weight of the occupant when the occupant is seated on the seat body 13.

A power supply headrest holder 17 (an example of a headrest holder according to this embodiment) in which a power supply coil 16 is located and a headrest holder 18 are formed side by side in an upper part of the seat frame 14 with an interval in the left-right direction. Each of the power supply headrest holder 17 and the headrest holder 18 is made of metal, and has a tubular shape extending in the vertical direction (i.e. up-down direction). The cross-sectional shape of each of the power supply headrest holder 17 and the headrest holder 18 may be circular, oval, or polygonal such as triangular or rectangular. The position of the upper end of each of the power supply headrest holder 17 and the headrest holder 18 is not limited, and the upper end of each of the power supply headrest holder 17 and the headrest holder 18 may be located lower than, equal in height to, or higher than the upper surface of the cushion 15 located at the upper end of the seat body 13. In this embodiment, the upper end of each of the power supply headrest holder 17 and the headrest holder 18 is at the same height position as the upper surface of the cushion 15.

A bottom wall 19 (an example of a support portion) is formed at the lower end of the power supply headrest holder 17. A through hole 20 is formed through the bottom wall 19 in the vertical direction. An elastic member 21 is placed on the upper surface of the bottom wall 19.

The elastic member 21 is formed to be elastically deformable in the vertical direction. As the elastic member 21, a spring of any shape such as a helical spring, a flat spring, or a volume spring may be used. The elastic member 21 may be made of metal, synthetic resin such as synthetic rubber, or natural rubber.

The elastic member 21 according to this embodiment is a helical spring made of metal. The inner diameter of the elastic member 21 is larger than the diameter of the through hole 20. The outer diameter of the elastic member 21 is slightly smaller than the inner diameter of the power supply headrest holder 17. Thus, the elastic member 21 is held in a state of being placed on the upper surface of the bottom wall 19.

The power supply coil 16 is located at the upper end of the elastic member 21. The upper end of the elastic member 21 and the lower end of the power supply coil 16 may or may not be fixed. The outer diameter of the power supply coil 16 is slightly larger than the outer diameter of the elastic member 21. The outer diameter of the power supply coil 16 is equal to or slightly smaller than the inner diameter of the power supply headrest holder 17. Thus, the power supply coil 16 is in sliding contact with the inner wall of the power supply headrest holder 17, and accordingly is vertically movable inside the power supply headrest holder 17.

A seat-side electric wire 22 is connected to the power supply coil 16. The seat-side electric wire 22 extends downward from the power supply coil 16 through the inside of the elastic member 21. The seat-side electric wire 22 is routed inside the seat body 13 through the through hole 20 formed in the bottom wall 19 of the power supply headrest holder 17, and connected to a power source (not shown).

[Headrest 10]

An electric device such as a speaker 23 is attached to the headrest 10. The electric device attached to the headrest 10 is not limited to the speaker 23, and may be any electric device such as a monitor, a heater, or a fan.

A headrest frame 24 made of metal is located inside the headrest 10. The headrest frame 24 extends in the left-right direction. An electronic control unit (ECU) 25 is attached to the headrest frame 24. The ECU 25 is connected to the speaker 23 by a speaker electric wire 26.

The ECU 25 includes an antenna 27. The ECU 25 outputs an audio signal to the speaker 23 based on a signal received via the antenna 27. The speaker 23 outputs sound based on this signal.

A power supply headrest stay 28 (an example of a headrest stay according to the present invention) and a headrest stay 29 are arranged side by side at respective positions near the left and right ends of the headrest frame 24, with an interval in the left-right direction. Each of the power supply headrest stay 28 and the headrest stay 29 is made of metal, and has a tubular shape extending in the vertical direction.

The outer diameter of the headrest stay 29 is smaller than the inner diameter of the headrest holder 18. This allows the headrest stay 29 to be fitted into the headrest holder 18.

The outer diameter of the power supply headrest stay 28 is smaller than the inner diameter of the power supply headrest holder 17. This allows the power supply headrest stay 28 to be fitted into the power supply headrest holder 17.

A power reception coil 30 is fixed to the lower end of the power supply headrest stay 28. The power supply headrest stay 28 and the power reception coil 30 are fixed by screwing, adhesion, a known locking structure, or the like, although not shown in detail.

A headrest-side electric wire 31 is connected to the power reception coil 30. The headrest-side electric wire 31 extends upward from the power reception coil 30 and is routed. The headrest-side electric wire 31 passes through the inside of the power supply headrest stay 28 and is led out from the upper end of the power supply headrest stay 28. The headrest-side electric wire 31 is connected to the ECU 25. Thus, power from the power source is supplied to the speaker 23 via the seat-side electric wire 22, the power supply coil 16, the power reception coil 30, the headrest-side electric wire 31, and the ECU 25.

The power supply headrest stay 28 and the power supply headrest holder 17 are fixed at a certain height position in the vertical direction by a known support member (not shown). Likewise, the headrest stay 29 and the headrest holder 18 are fixed at a certain height position in the vertical direction by a known support member (not shown).

[Power Supply Structure 11]

The power supply structure 11 according to this embodiment includes the power supply coil 16, the power reception coil 30, and the elastic member 21.

The power supply coil 16 and the power reception coil 30 are each formed by spirally winding an electric wire around a core made of a magnetic material such as ferrite, synthetic resin, or the like, although not shown in detail. As the electric wire, for example, a copper wire coated with an insulating layer of enamel or the like may be used.

In this embodiment, the outer diameter of the power supply coil 16 is larger than the outer diameter of the power reception coil 30. The outer diameter of the power supply coil 16 and the outer diameter of the power reception coil 30 are not limited, and the outer diameter of the power supply coil 16 may be smaller than the outer diameter of the power reception coil 30.

The power reception coil 30 is placed on the upper surface of the power supply coil 16. The power reception coil 30 is not fixed to the power supply coil 16. The power reception coil 30 and the power supply coil 16 are therefore separable. The power reception coil 30 is located coaxially with the power supply coil 16. The method of supplying power from the power supply coil 16 to the power reception coil 30 may be an electromagnetic induction method or a magnetic resonance method.

The elastic member 21 located below the power supply coil 16 urges the power supply coil 16 in a direction (upward) that approaches the power reception coil 30. Even in the case where the power reception coil 30 moves upward, i.e. moves in a direction that separates from the power supply coil 16, the power supply coil 16 is in contact with the power reception coil 30 as a result of being urged upward by the elastic member 21.

Since the power supply headrest holder 17 and the power supply headrest stay 28 are made of metal, electromagnetic waves generated from the power supply coil 16 and the power reception coil 30 can be electromagnetically shielded.

Functions and Effects According to Embodiment

The functions and effects according to this embodiment will be described below. FIG. 1 shows a structure in which the headrest 10 is fixed to the seat body 13 at the lowest position. In this state, the lower end of the headrest 10 is in contact with the upper end of the seat body 13.

The power reception coil 30 attached to the lower end of the power supply headrest stay 28 presses the power supply coil 16 downward from above. As a result, the power supply coil 16 presses the elastic member 21 downward. The elastic member 21 urges the power supply coil 16 upward by its elastic force. This causes the power supply coil 16 and the power reception coil 30 to be contact with each other.

Figure 2:
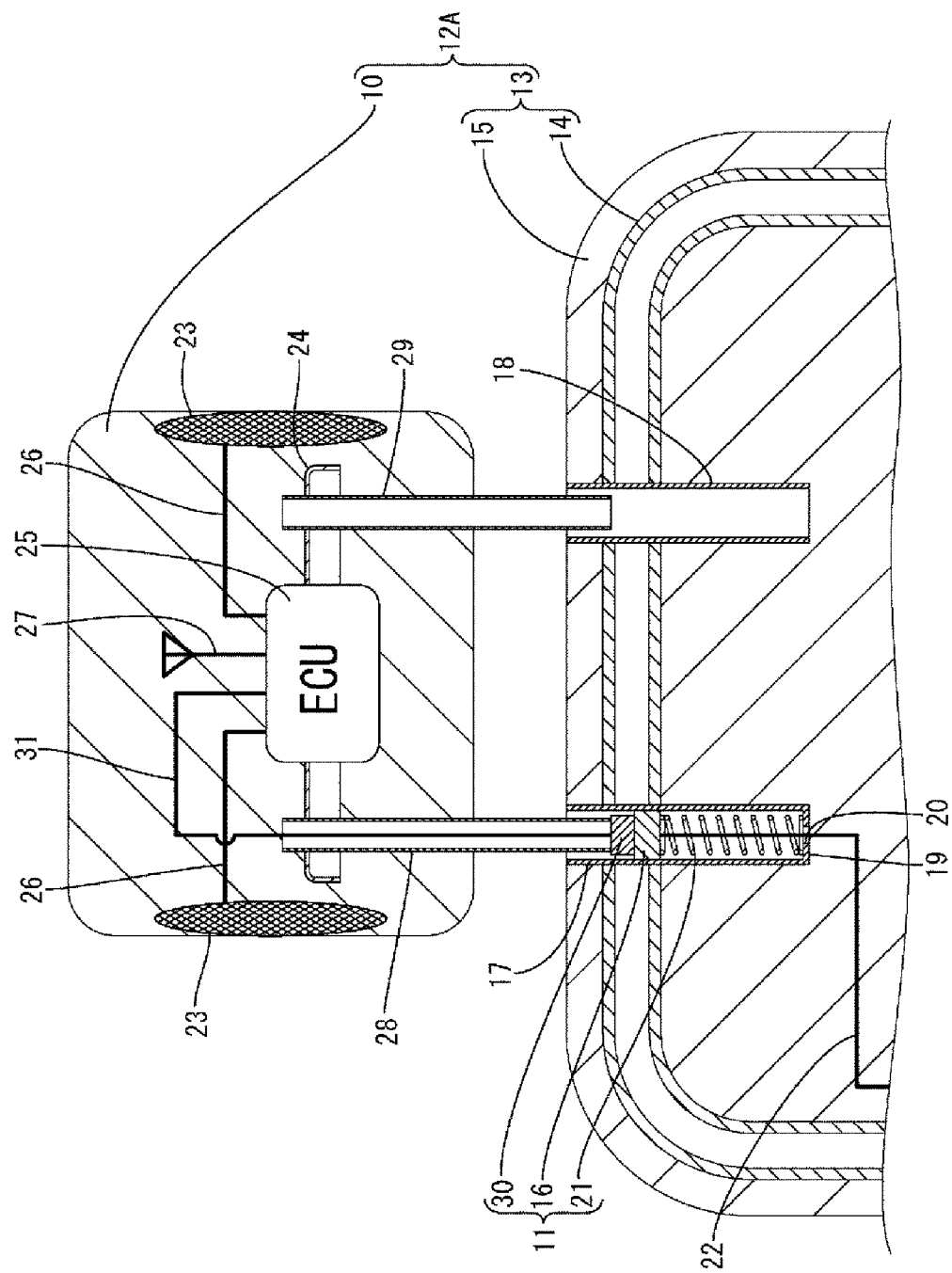
FIG. 2 is a partially enlarged schematic sectional view showing the power supply structure for a headrest attached to the seat device in a state in which the headrest is located higher than in the state shown in FIG. 1.

FIG. 2 shows a structure in which the headrest 10 is fixed to the seat body 13 at the highest position. In this state, the headrest 10 and the seat body 13 are separated in the vertical direction.

As the headrest 10 moves upward, the power reception coil 30 attached to the lower end of the power supply headrest stay 28 moves upward. Since the power supply coil 16 is urged upward by the elastic member 21, the power supply coil 16 follows the power reception coil 30 to move upward. Consequently, the power supply coil 16 and the power reception coil 30 are in contact with each other even in the case where the headrest 10 moves upward. A decrease in the efficiency of supplying power from the power supply coil 16 to the power reception coil 30 is thus prevented.

The power supply structure 11 for the headrest 10 according to this embodiment is the power supply structure 11 for the headrest 10 for supplying power to the headrest 10 attached to the seat body 13, including: the power supply coil 16 that is located in the seat body 13; the power reception coil 30 that is located in the headrest 10 and receives power from the power supply coil 16; and the elastic member 21 that is located in the seat body 13 and urges the power supply coil 16 in a direction that approaches the power reception coil 30.

Since power can be supplied from the power supply coil 16 to the power reception coil 30 without using a connector structure, the seat body 13 and the headrest 10 can be electrically connected by a simple structure. Moreover, the work of electrically connecting the seat body 13 and the headrest 10 can be simplified.

The elastic member 21 urges the power supply coil 16 in a direction that approaches the power reception coil 30. Therefore, even in the case where the headrest 10 moves in the vertical direction relative to the seat body 13, the power supply coil 16 can follow the power reception coil 30, so that the power supply coil 16 and the power reception coil 30 can be kept in contact with each other. A decrease in the efficiency of supplying power from the power supply coil 16 to the power reception coil 30 can thus be prevented.

Moreover, according to this embodiment, the seat body 13 includes the power supply headrest holder 17 that has a tubular shape extending toward the headrest 10, the headrest 10 includes the power supply headrest stay 28 that has a tubular shape extending toward the seat body 13 and is fitted into the power supply headrest holder 17, the power supply coil 16 is located in the power supply headrest holder 17, and the power reception coil 30 is located in the power supply headrest stay 28.

The headrest 10 is attached to the seat body 13 as a result of the headrest stay 29 and the headrest holder 18 being fitted together. By installing the power reception coil 30 in one of the headrest stays 29 as the power supply headrest stay 28 and installing the power supply coil 16 in one of the headrest holders 18 as the power supply headrest holder 17, the power supply structure 11 can be installed in the seat device 12 without an increase in the number of parts.

Moreover, according to this embodiment, the power supply headrest holder 17 includes the bottom wall 19 that supports the elastic member 21 from below, the power supply coil 16 is located above the elastic member 21, and the power reception coil 30 is fixed at a position close to the lower end of the power supply headrest stay 28.

According to this embodiment, the elastic member 21 can be held to the power supply headrest stay 28 by a simple structure.

Embodiment 2

Figure 3:
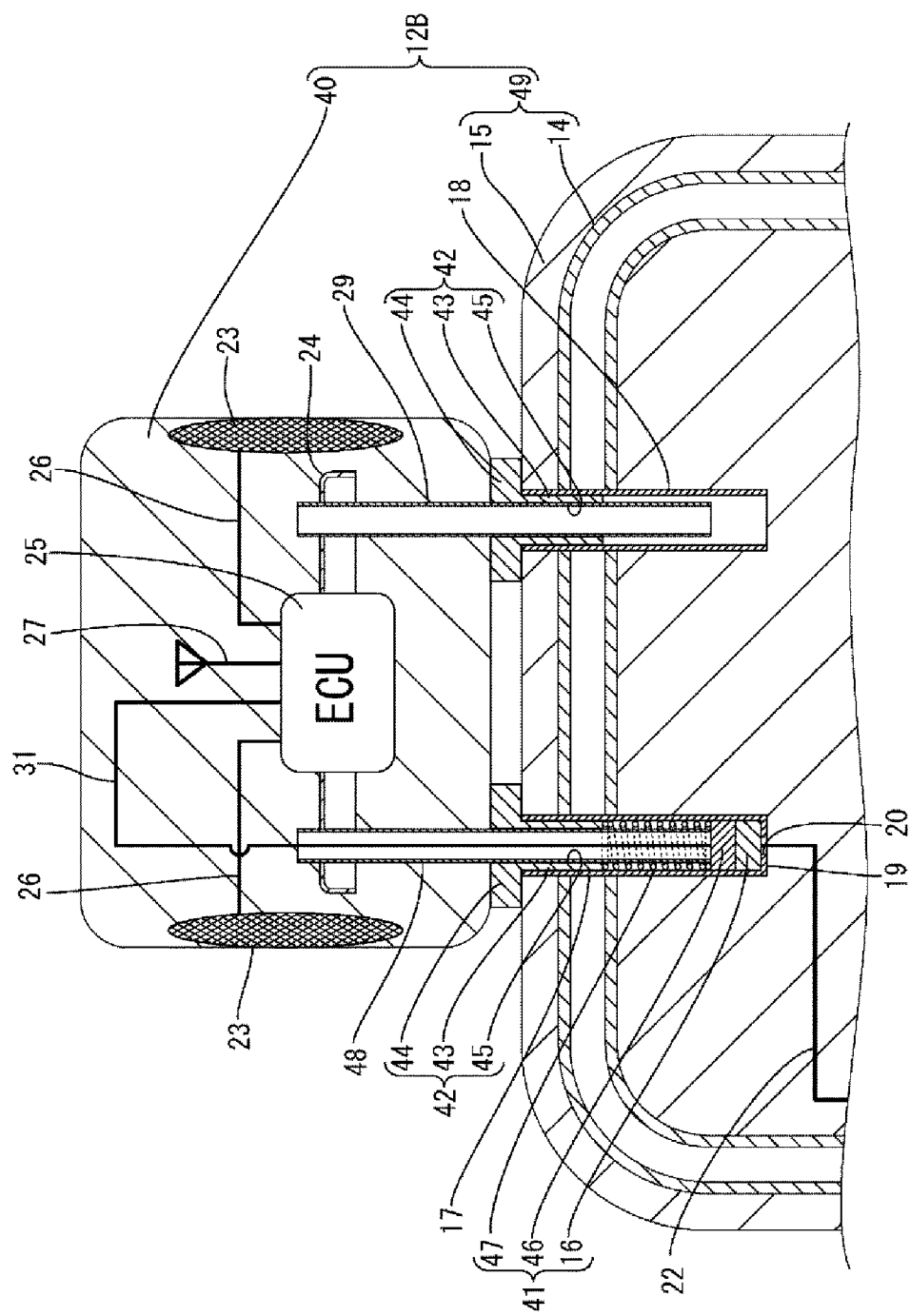
FIG. 3 is a partially enlarged schematic sectional view showing a power supply structure for a headrest attached to a seat device according to Embodiment 2.

A power supply structure 41 for a headrest 40 attached to a seat device 12B according to Embodiment 2 of the present disclosure will be described below, with reference to FIGS. 3 and 4. As shown in FIG. 3, a headrest cap 42 is attached to the upper end of a power supply headrest holder 17, and a headrest cap 42 is attached to the upper end of a headrest holder 18. The headrest cap 42 attached to the power supply headrest holder 17 and the headrest cap 42 attached to the headrest holder 18 have the same shape and size.

Each headrest cap 42 includes a shaft portion 43 fitted in the power supply headrest holder 17 or the headrest holder 18 and extending in the vertical direction, and a lid portion 44 formed at the upper end of the shaft portion 43. The headrest cap 42 is made of synthetic resin. The headrest cap 42 has an insertion hole 45 therethrough vertically. A power supply headrest stay 48 or the headrest stay 29 is inserted into the insertion holes 45 of the headrest cap 42.

The shaft portion 43 has a cylindrical shape. The outer shape of the shaft portion 43 is substantially the same as the inner shape of the power supply headrest holder 17, and substantially the same as the inner shape of the headrest holder 18. The length of the shaft portion 43 in the vertical direction is shorter than the length of each of the power supply headrest holder 17 and the headrest holder 18 in the vertical direction.

The lid portion 44 has a larger diameter than the outer shape of the shaft portion 43. The lid portion 44 may have any shape such as circular or rectangular when seen from above.

A power supply coil 16 is placed on the upper surface of the bottom wall 19 of the power supply headrest holder 17. A power reception coil 46 is placed on the upper surface of the power supply coil 16. In this embodiment, the outer diameter of the power supply coil 16 is substantially equal to the outer diameter of the power reception coil 46. The outer diameter of the power supply coil 16 and the outer diameter of the power reception coil 46 are equal to or slightly smaller than the inner diameter of the power supply headrest holder 17.

An elastic member 47 is located on the upper surface of the power reception coil 46. The elastic member 47 is a helical spring. The elastic member 47 is located in a gap between the power supply headrest holder 17 and the power supply headrest stay 48. The lower end of the elastic member 47 is in contact with the upper surface of the power reception coil 46 from above. The upper end of the elastic member 47 is in contact with the lower end of the shaft portion 43 of the headrest cap 42 from below. The power reception coil 46 is thus urged in a direction (downward) that approaches the power supply coil 16.

In this embodiment, the lower end of the power supply headrest stay 48 and the power reception coil 46 are not fixed.

The structures other than the above are substantially the same as those in Embodiment 1, and accordingly the same members are given the same reference numerals and repeated description is omitted.

Functions and Effects According to Embodiment

The functions and effects according to this embodiment will be described below. FIG. 3 shows a structure in which the headrest 40 is fixed to the seat body 49 at the lowest position. In this state, the lower end of the headrest 40 is in contact with the upper end of the headrest cap 42.

In this embodiment, the lower end of the power supply headrest stay 48 is in contact with the upper surface of the power reception coil 46 and presses the power reception coil 46 downward. The elastic member 47 located between the lower end of the headrest cap 42 and the power reception coil 46 urges the power reception coil 46 downward by its elastic force. This causes the power supply coil 16 and the power reception coil 46 to be contact with each other.

Figure 4:
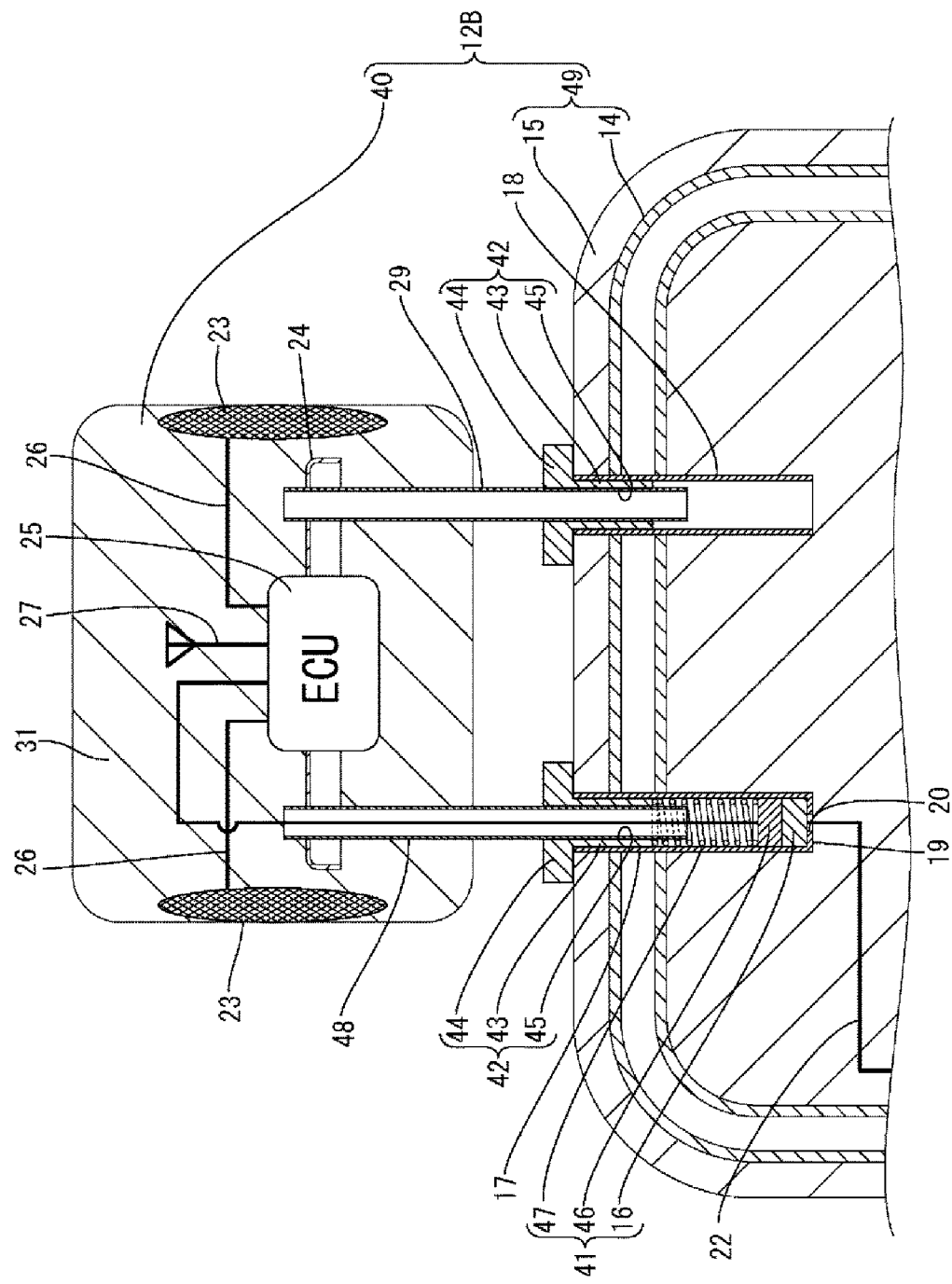
FIG. 4 is a partially enlarged schematic sectional view showing the power supply structure for a headrest attached to the seat device in a state in which the headrest is located higher than in the state shown in FIG. 3.

FIG. 4 shows a structure in which the headrest 40 is fixed to the seat body 49 at the highest position. In this state, the headrest 40 is separated from the seat body 49 and the headrest cap 42 in the vertical direction.

As the headrest 40 moves upward, the power supply headrest stay 48 moves upward. In this embodiment, the lower end of the power supply headrest stay 48 and the power reception coil 46 are not fixed, so that the lower end of the power supply headrest stay 48 and the power reception coil 46 are separated.

Meanwhile, the power reception coil 46 is pressed downward by the elastic force of the elastic member 47. Consequently, the power supply coil 16 and the power reception coil 46 are in contact with each other even in the case where the headrest 40 moves upward.

According to this embodiment, the upper end of each of the power supply headrest holder 17 and the headrest holder 18 is closed by the lid portion 44. This prevents foreign matter from entering into the power supply headrest holder 17 and the headrest holder 18.

Embodiment 3

Figure 5:
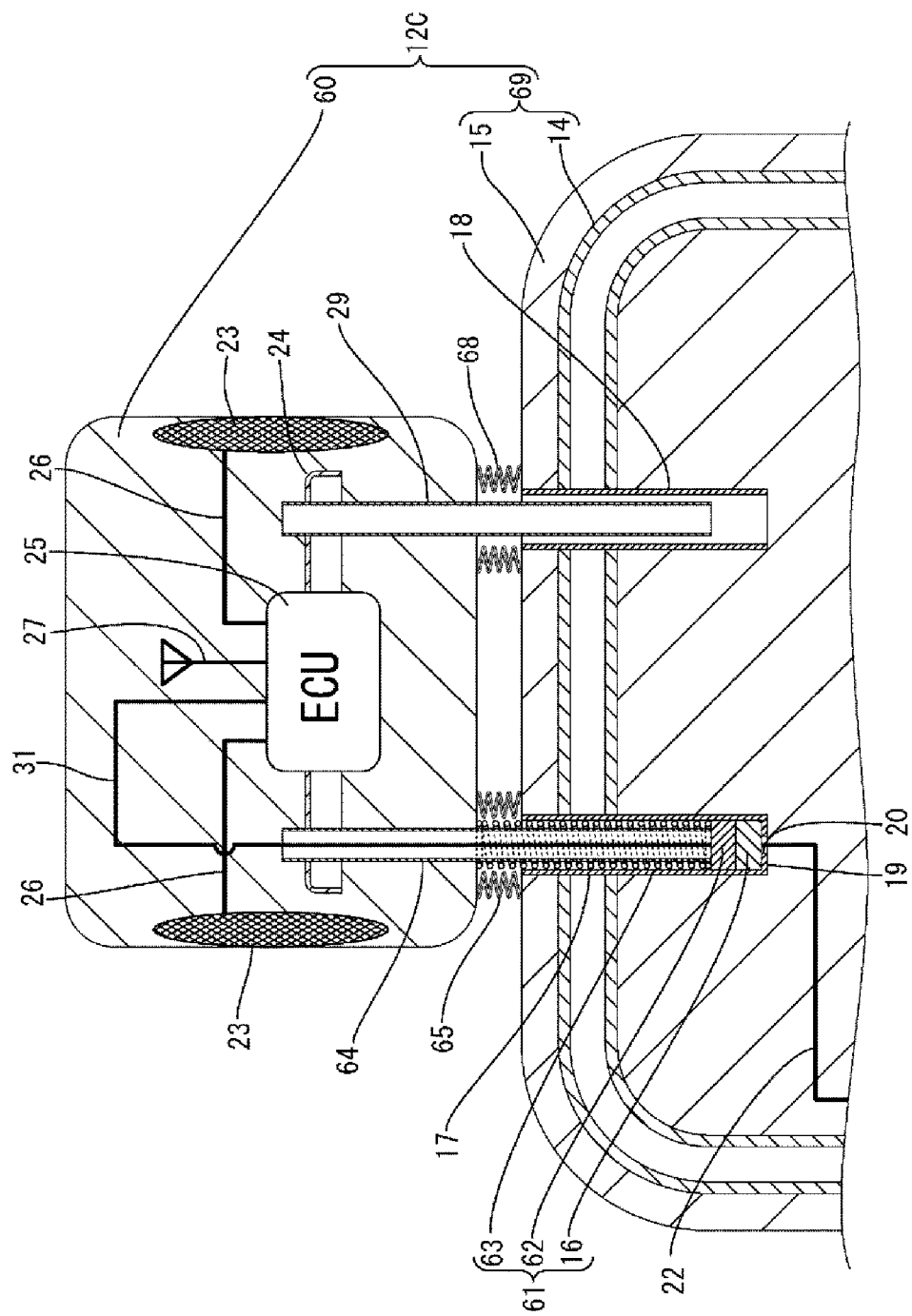
FIG. 5 is a partially enlarged schematic sectional view showing a power supply structure for a headrest attached to a seat device according to Embodiment 3.

A power supply structure 61 for a headrest 60 attached to a seat device 12C according to Embodiment 3 of the present disclosure will be described below, with reference to FIGS. 5 to 7. As shown in FIG. 5, a power supply coil 16 is placed on the upper surface of a bottom wall 19 of a power supply headrest holder 17. A power reception coil 62 is placed on the upper surface of the power supply coil 16. In this embodiment, the outer diameter of the power supply coil 16 is substantially equal to the outer diameter of the power reception coil 62. The outer diameter of the power supply coil 16 and the outer diameter of the power reception coil 62 are equal to or slightly smaller than the inner diameter of the power supply headrest holder 17.

An elastic member 63 is located on the upper surface of the power reception coil 62. The elastic member 63 is a helical spring. The elastic member 63 is located in a gap between the power supply headrest holder 17 and a power supply headrest stay 64.

The lower end of the elastic member 63 is in contact with the upper surface of the power reception coil 62 from above. The upper end of the elastic member 63 is in contact with the lower end of the headrest 60 from below. That is, the elastic member 63 is located between the power supply coil 16 and the headrest 60 in the vertical direction. The power reception coil 62 is thus urged in a direction (downward) that approaches the power supply coil 16.

In this embodiment, the lower end of the power supply headrest stay 64 and the power reception coil 62 are not fixed.

A cover 65 (an example of a cover) surrounding the power supply headrest stay 64 is provided around the power supply headrest stay 64, between the seat body 13 and the headrest 60. The cover 65 has a bellows-like tubular shape. The cover 65 can thus expand and contract in the vertical direction.

Figure 6:
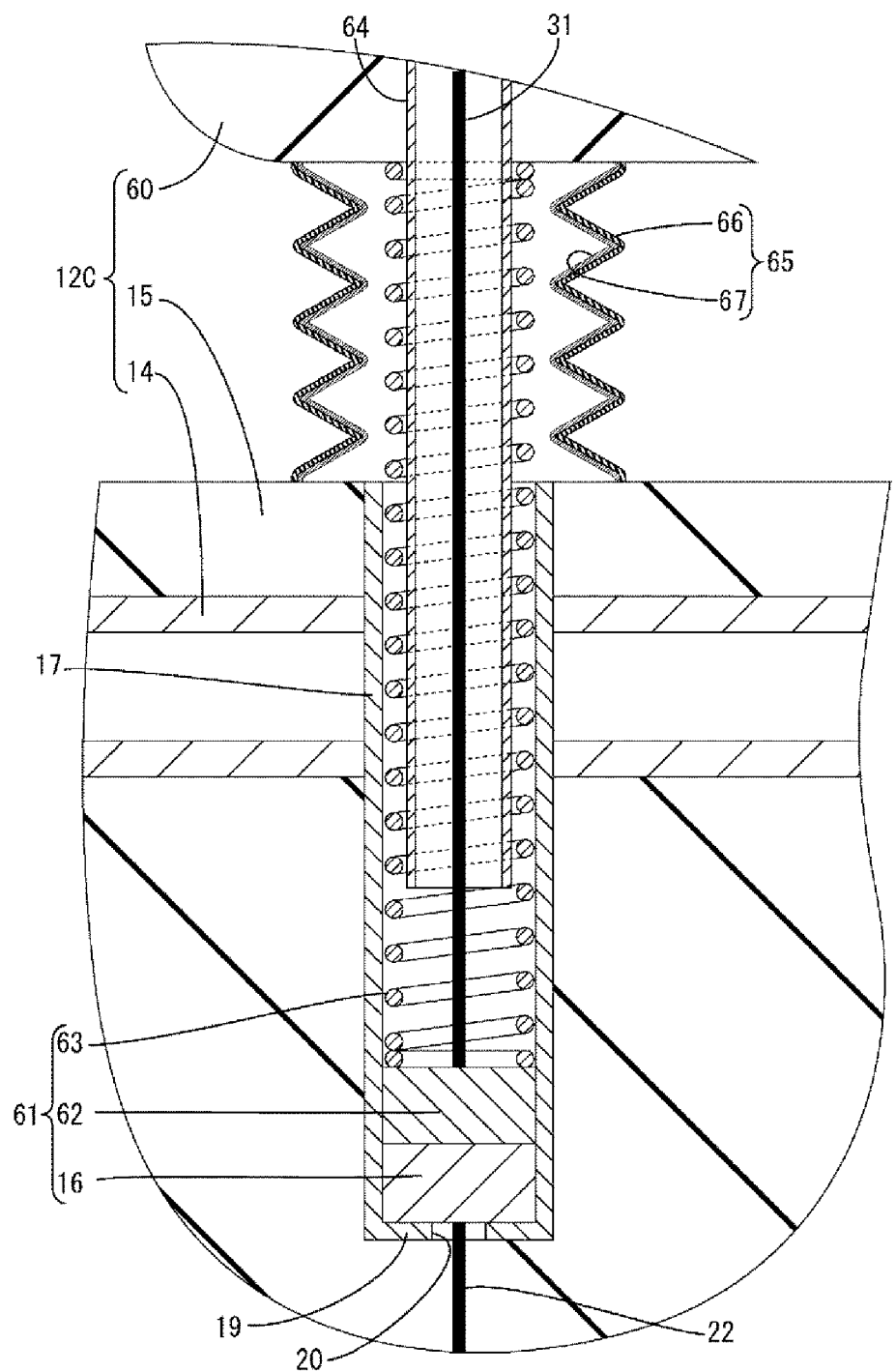
FIG. 6 is a partially enlarged schematic sectional view showing the power supply structure for a headrest.

As shown in FIG. 6, the cover 65 includes an insulating outer skin 66 and a conductive shield member 67 formed on the inner surface of the outer skin 66. The outer skin 66 may be made of any material such as insulating synthetic resin or woven fabric.

The shield member 67 may be a braided wire formed by weaving thin metal wires, or metal foil attached to the inner surface of the outer skin 66. Any metal such as copper, a copper alloy, aluminum, or an aluminum alloy can be selected as the metal forming the shield member 67. The shield member 67 can prevent leakage of electromagnetic waves from the power supply headrest stay 64 located between the headrest 60 and the seat body 13.

A cover 68 surrounding the headrest stay 29 is provided around the headrest stay 29, between the seat body 13 and the headrest 60.

The cover 68 surrounding the headrest stay 29 may have the same shape and size as the cover 65 surrounding the power supply headrest stay 64. The cover 68 surrounding the headrest stay 29 may not have the shield member 67.

The structures other than the above are substantially the same as those in Embodiment 1, and accordingly the same members are given the same reference numerals and repeated description is omitted.

Functions and Effects According to Embodiment

The functions and effects according to this embodiment will be described below. FIG. 5 shows a structure in which the headrest 60 is fixed to the seat body 69 at the lowest position.

In this embodiment, the lower end of the power supply headrest stay 64 is in contact with the upper surface of the power reception coil 62 and presses the power reception coil 62 downward. The elastic member 63 located between the lower end of the headrest 60 and the power reception coil 62 urges the power reception coil 62 downward by its elastic force. This causes the power supply coil 16 and the power reception coil 62 to be contact with each other.

Figure 7:
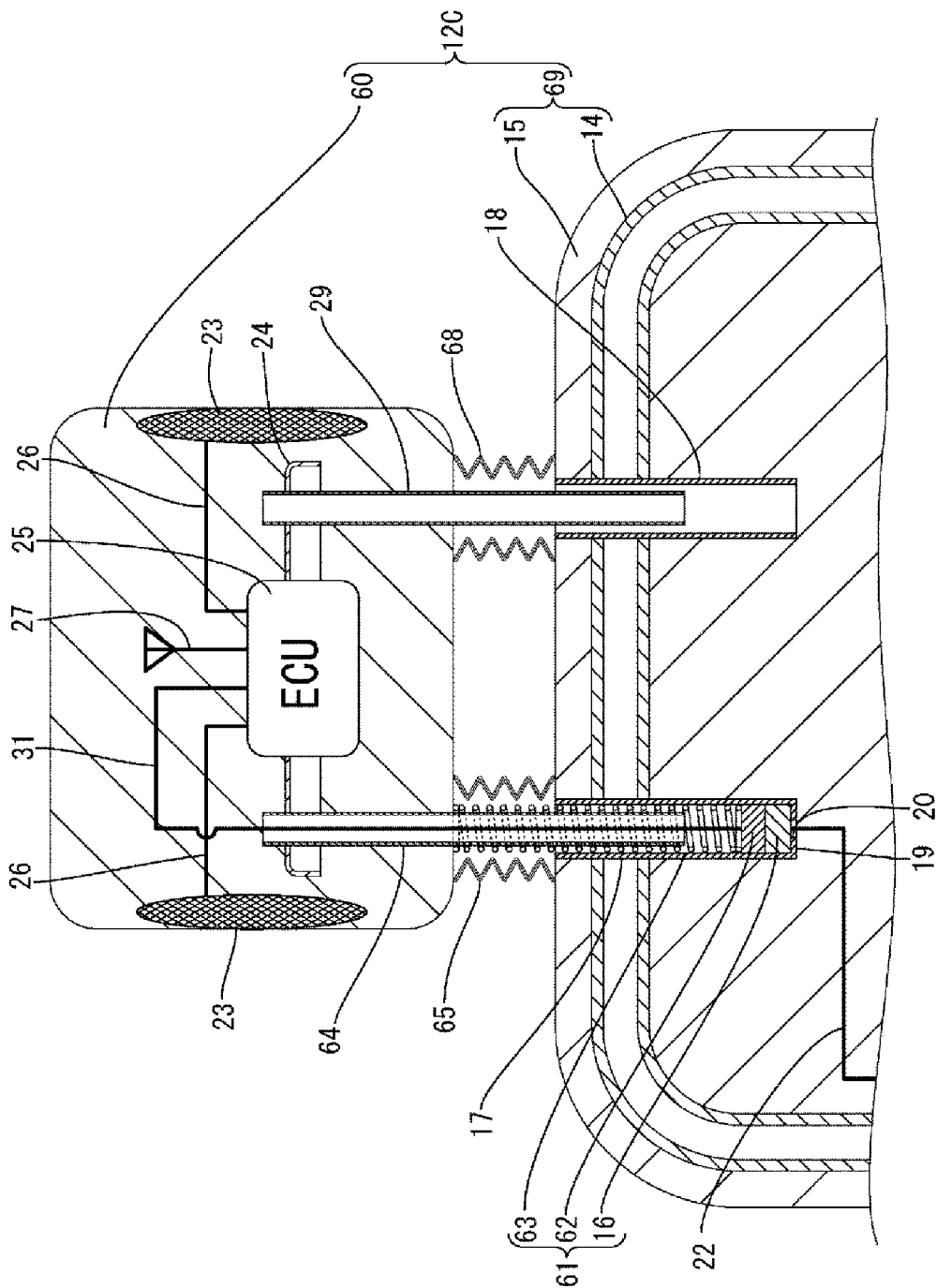
FIG. 7 is a partially enlarged schematic sectional view showing the power supply structure for a headrest attached to the seat device in a state in which the headrest is located higher than in the state shown in FIG. 5.

FIG. 7 shows a structure in which the headrest 60 is fixed to the seat body 69 at the highest position.

As the headrest 60 moves upward, the power supply headrest stay 64 moves upward. In this embodiment, the lower end of the power supply headrest stay 64 and the power reception coil 62 are not fixed, so that the lower end of the power supply headrest stay 64 and the power reception coil 62 are separated.

Meanwhile, the power reception coil 62 is pressed downward by the elastic force of the elastic member 63. Consequently, the power supply coil 16 and the power reception coil 62 are in contact with each other even in the case where the headrest 60 moves upward.

According to this embodiment, the power supply structure 61 for the headrest 60 can be protected by the cover 65.

Moreover, according to this embodiment, electromagnetic waves leaking from the power supply structure 61 for the headrest 60 can be shielded by the shield member 67 attached to the cover 65.

Embodiment 4

A power supply structure 81 for a headrest 80 attached to a seat device 12D according to Embodiment 4 of the present disclosure will be described below, with reference to FIGS. 8 and 9.

[Seat Body 82]

Two headrest holders 84 are formed in an upper part of a seat frame 83 with an interval in the left-right direction. Each headrest holder 84 is made of metal, and has a tubular shape extending in the vertical direction. The cross-sectional shape of each headrest holder 84 may be circular, oval, or polygonal such as triangular or rectangular. The position of the upper end of each headrest holder 84 is not limited, and the upper end of each headrest holder 84 may be located lower than, flush with, or higher than the upper surface of the cushion 15 located at the upper end of the seat body 82.

A headrest cap 42 is attached to the upper end of each headrest holder 84. The headrest cap 42 includes a shaft portion 43 fitted in the headrest holder 84 and extending in the vertical direction, and a lid portion 44 formed at the upper end of the shaft portion 43. The headrest cap 42 is made of synthetic resin. The headrest cap 42 has an insertion hole 45 through the shaft portion 43 and the lid portion 44 vertically. A headrest stay 85 is inserted into the insertion hole 45.

The shaft portion 43 has a cylindrical shape. The outer shape of the shaft portion 43 is substantially the same as the inner shape of the headrest holder 84. The length of the shaft portion 43 in the vertical direction is shorter than the length of the headrest holder 84 in the vertical direction.

The lid portion 44 has a larger diameter than the outer shape of the shaft portion 43. The lid portion 44 may have any shape such as circular or rectangular when seen from above.

Figure 8:
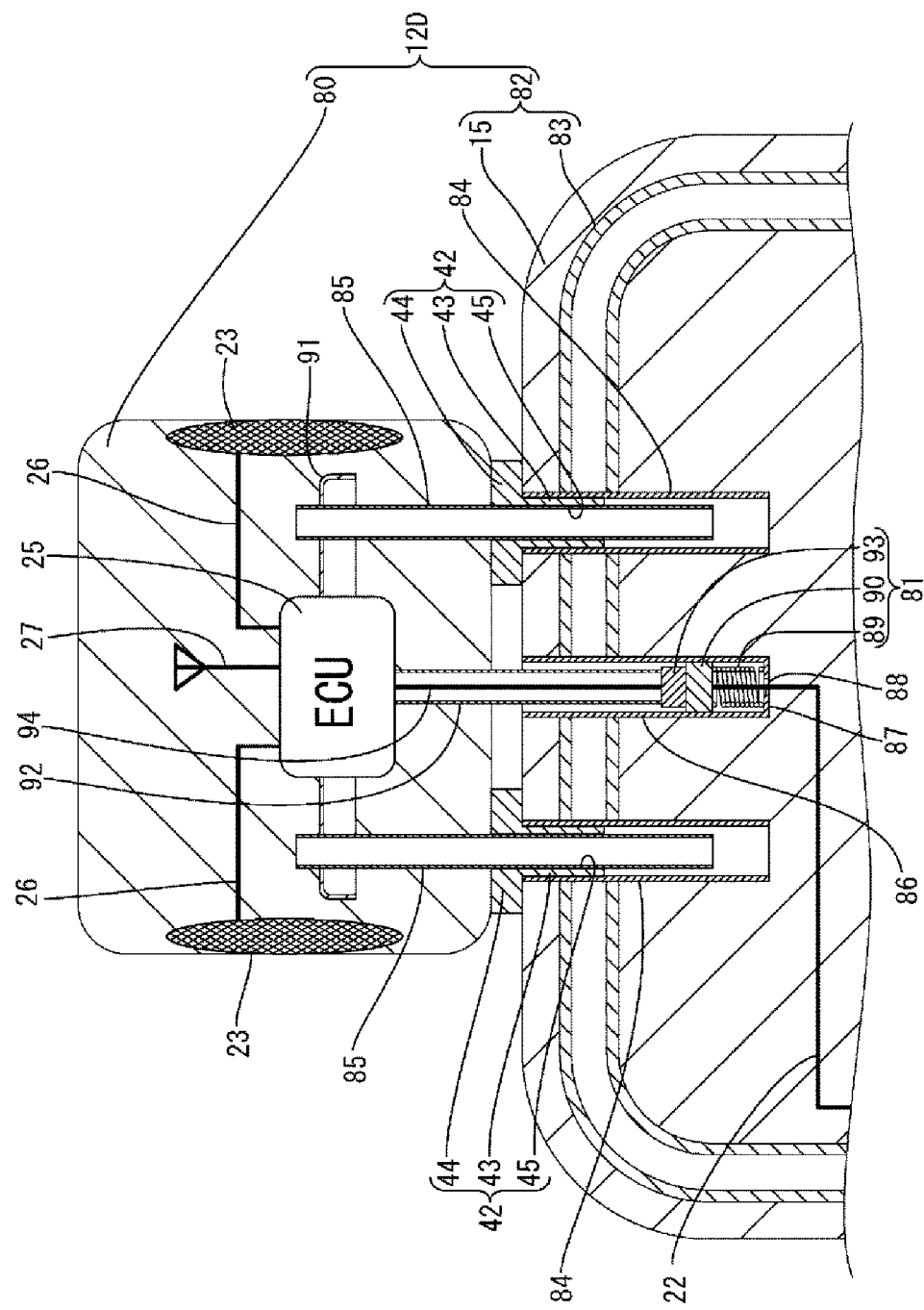
FIG. 8 is a partially enlarged schematic sectional view showing a power supply structure for a headrest attached to a seat device according to Embodiment 4.

As shown in FIG. 8, a power supply holder 86 is located between the two headrest holders 84 in the upper part of the seat frame 83. The power supply holder 86 is made of metal, and has a tubular shape extending in the vertical direction. The cross-sectional shape of the power supply holder 86 may be circular, oval, or polygonal such as triangular or rectangular. The position of the upper end of the power supply holder 86 is not limited, and the upper end of the power supply holder 86 may be located lower than, equal in height to, or higher than the upper surface of the cushion 15 located at the upper end of the seat body 82. In this embodiment, the upper end of the power supply holder 86 is at the same height position as the upper surface of the cushion 15.

A bottom wall 87 is formed at the lower end of the power supply holder 86. A through hole 88 is formed through the bottom wall 87 in the vertical direction. An elastic member 89 is placed on the upper surface of the bottom wall 87.

The elastic member 89 has the same structure as that in Embodiment 1, and accordingly repeated description is omitted. The elastic member 89 according to this embodiment is a helical spring made of metal. The inner diameter of the elastic member 89 is larger than the diameter of the through hole 88. The outer diameter of the elastic member 89 is slightly smaller than the inner diameter of the power supply holder 86. Thus, the elastic member 89 is held in a state of being placed on the upper surface of the bottom wall 87.

A power supply coil 90 is located at the upper end of the elastic member 89. The upper end of the elastic member 89 and the lower end of the power supply coil 90 may or may not be fixed. The outer diameter of the power supply coil 90 is slightly larger than the outer diameter of the elastic member 89. The outer diameter of the power supply coil 90 is equal to or slightly smaller than the inner diameter of the power supply holder 86. Thus, the power supply coil 90 is in sliding contact with the inner wall of the power supply holder 86, and accordingly is vertically movable inside the power supply holder 86.

A seat-side electric wire 22 is connected to the power supply coil 90. The seat-side electric wire 22 extends downward from the power supply coil 90 through the inside of the elastic member 89. The seat-side electric wire 22 is routed inside the seat body 82 through the through hole 88 formed in the bottom wall 87 of the power supply holder 86, and connected to a power source (not shown).

[Headrest 80]

Two headrest stays 85 are arranged side by side at respective positions near the left and right ends of the headrest frame 91, with an interval in the left-right direction. Each headrest stay 85 is made of metal, and has a tubular shape extending in the vertical direction.

The outer diameter of the headrest stay 85 is smaller than the inner diameter of the headrest holder 84. This allows the headrest stay 85 to be fitted into the headrest holder 84.

A power supply stay 92 is provided between the two headrest stays 85. In this embodiment, the power supply stay 92 extends downward from the ECU 25. The power supply stay 92 may extend downward from the headrest frame 91.

The outer diameter of the power supply stay 92 is smaller than the inner diameter of the power supply holder 86. This allows the power supply stay 92 to be fitted into the power supply holder 86.

A power reception coil 93 is fixed to the lower end of the power supply stay 92. The power supply stay 92 and the power reception coil 93 are fixed by screwing, adhesion, a known locking structure, or the like, although not shown in detail.

A headrest-side electric wire 94 is connected to the power reception coil 93. The headrest-side electric wire 94 extends upward from the power reception coil 93 and is routed. The headrest-side electric wire 94 passes through the inside of the power supply stay 92 and is connected to the ECU 25.

The structures other than the above are substantially the same as those in Embodiment 1, and accordingly the same members are given the same reference numerals and repeated description is omitted.

Functions and Effects According to Embodiment

The functions and effects according to this embodiment will be described below. FIG. 8 shows a structure in which the headrest 80 is fixed to the seat body 82 at the lowest position. In this state, the lower end of the headrest 80 is in contact with the upper end of the headrest cap 42.

The power reception coil 93 attached to the lower end of the power supply stay 92 presses the power supply coil 90 downward from above. As a result, the power supply coil 90 presses the elastic member 89 downward. The elastic member 89 urges the power supply coil 90 upward by its elastic force. This causes the power supply coil 90 and the power reception coil 93 to be in contact with each other.

Figure 9:
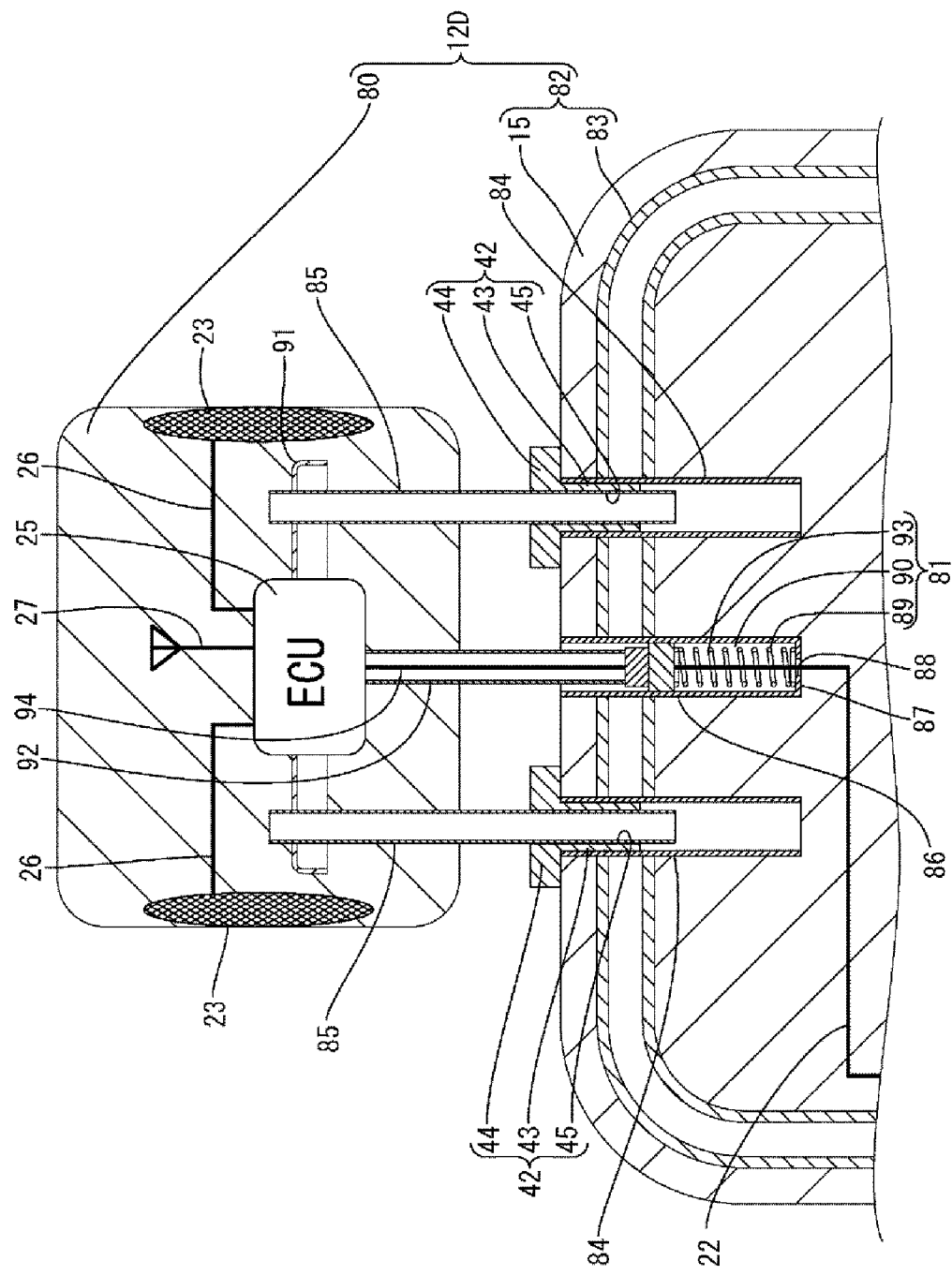
FIG. 9 is a partially enlarged schematic sectional view showing the power supply structure for a headrest attached to the seat device in a state in which the headrest is located higher than in the state shown in FIG. 8.

FIG. 9 shows a structure in which the headrest 80 is fixed to the seat body 82 at the highest position. In this state, the headrest 80 is separated from the seat body 82 and the headrest cap 42 in the vertical direction.

As the headrest 80 moves upward, the power reception coil 93 attached to the lower end of the power supply stay 92 moves upward. Since the power supply coil 90 is urged upward by the elastic member 89, the power supply coil 90 follows the power reception coil 93 to move upward. Consequently, the power supply coil 90 and the power reception coil 93 are in contact with each other even in the case where the headrest 80 moves upward.

According to this embodiment, the existing headrest holders 84 and headrest stays 85 can be used, so that an increase in manufacturing costs can be prevented.

OTHER EMBODIMENTS (1) The power supply headrest stay according to Embodiments 1 to 3 may be configured to be fitted onto the power supply headrest holder. The headrest stay may be configured to be fitted into the headrest holder.

(2) In Embodiments 1 to 3, the two headrest stays included in the headrest may both be power supply headrest stays, and the two headrest holders included in the seat body may both be power supply headrest holders. In this way, even in the case where one of the power supply structures for the headrest fails, the other power supply structure can supply power to the headrest.

(3) Although the cover 65 surrounding the power supply headrest stay 64 according to Embodiment 3 includes the shield member 67, the cover 65 is not limited to such, and may not include the shield member 67.

(4) The power supply stay 92 according to Embodiment 4 may be fitted onto the power supply holder 86.

(5) The power supply stay 92 according to Embodiment 4 may be surrounded by the cover 65 including the shield member 67.

LIST OF REFERENCE NUMERALS 10, 40, 60, 80 headrest
11, 41, 61, 81 power supply structure
12A, 12B, 12C, 12D seat device
13, 49, 69, 82 seat body
14, 83 seat frame
15 cushion
16, 90 power supply coil
17 power supply headrest holder
18, 84 headrest holder
19, 87 bottom wall
20, 88 through hole
21, 47, 63, 89 elastic member
22 seat-side electric wire
23 speaker
24, 91 headrest frame
25 ECU
26 speaker electric wire
27 antenna
28, 48, 64 power supply headrest stay
29, 85 headrest stay
30, 46, 62, 93 power reception coil
31, 94 headrest-side electric wire
42 headrest cap
43 shaft portion
44 lid portion
45 insertion hole
65 cover
66 outer skin
67 shield member
68 cover
86 power supply holder
92 power supply stay

What is claimed is:

1. A power supply structure for a headrest, comprising:
   a seat body provided with a headrest holder that extends toward the headrest and includes a support portion at a lower end thereof;
   a pair of headrest stays disposed at left and right portions of the headrest, respectively and extending toward the seat body;
   a power supply coil provided in the headrest holder of the seat body;
   a power reception coil fixed to a lower end of one of the pair of headrest stays in the headrest and configured to receive power from the power supply coil; and
   an elastic member provided either below the power supply coil or above the power reception coil in the headrest holder that includes the support portion and configured to press the power supply coil and the power reception coil in a direction that approaches each other in a state where the elastic member or the power supply coil is supported by the support portion of the headrest holder.

2. The power supply structure for a headrest according to claim 1,
   wherein the headrest holder has a tubular shape,
   each of the pair of headrest stays has a tubular shape and is fitted into or fitted onto the headrest holder.

3. The power supply structure for a headrest according to claim 2,
   wherein the support portion of the headrest holder includes a bottom wall that supports the elastic member or the power supply coil from below.

4. The power supply structure for a headrest according to claim 2,
   wherein a headrest cap having an insertion hole through which the headrest stay passes is attached to an upper end of the headrest holder, and
   the elastic member is located between the headrest cap and the power supply coil.

5. The power supply structure for a headrest according to claim 2,
   wherein the elastic member is located between a lower end of the headrest and the power supply coil.

6. The power supply structure for a headrest according to claim 2, comprising
   a cover located around the headrest stay and having both a bellows shape and a tubular shape, the cover surrounding the headrest stay and being capable of expanding and contracting in a vertical direction.

7. The power supply structure for a headrest according to claim 6,
   wherein a conductive shield member is located at an inner surface of the cover.

8. The power supply structure for a headrest according to claim 1,
   wherein the headrest holder of the seat body has a tubular shape, and the seat body includes a power supply holder different from the headrest holder,
   the power supply holder has a tubular shape extending toward the headrest,
   the pair of headrest stays extend toward the seat body, and the headrest includes a power supply stay different from the headrest stay,
   the power supply stay has a tubular shape and is fitted into or fitted onto the power supply holder, and
   the power supply coil is located in the power supply holder, and the power reception coil is located in the power supply stay.

9. The power supply structure for a headrest according to claim 1, wherein the headrest includes a frame extending in a left-right direction and attached to the seat body through the headrest holder.

* * * * *